US005439263A

United States Patent [19]

Chambers

[11] Patent Number: 5,439,263

[45] Date of Patent: Aug. 8, 1995

[54] HAND TOOLS FOR PULLING POSTS THROUGH COMPUTER PAPER PRINTOUTS

[76] Inventor: Harry A. Chambers, 243 Carlan Rd., Commerce, Ga. 30529-9246

[21] Appl. No.: 209,235

[22] Filed: Mar. 14, 1994

[51] Int. Cl.[6] ..... B25J 11/00

[52] U.S. Cl. ..... 294/26

[58] Field of Search ..... 294/1.1, 3.6, 25, 26; 29/237.5, 241, 270, 278, 283, 700; 66/4, 117, 118; 81/487, 488; 223/99, 102, 113; 281/21.1, 28, 51; D3/28; D19/32

[56] References Cited

U.S. PATENT DOCUMENTS

| | | | |
|---|---|---|---|
| D. 259,523 | 6/1981 | Hopper | 66/118 X |
| D. 297,071 | 8/1988 | Mayer | D3/28 X |
| 377,160 | 1/1888 | Hunter | 223/102 |
| 1,208,958 | 12/1916 | Hawkins | 66/118 |
| 1,540,810 | 6/1925 | Simon | 223/113 |
| 1,709,631 | 4/1929 | Schmidt | 223/102 X |
| 2,059,188 | 11/1936 | Alford | 294/26 X |
| 2,586,733 | 2/1952 | Sologaistoa | 66/117 |
| 3,029,503 | 4/1962 | Meyer | 29/283 |
| 3,531,148 | 9/1970 | Rohde | 294/26 |
| 4,124,153 | 11/1978 | Mann | 223/102 |

*Primary Examiner*—Johnny D. Cherry

[57] ABSTRACT

A hand tool for pulling posts through computer paper printouts comprising an essentially rigid wire with limited flexibility having an upper end and a lower end and an elongated linear central extent therebetween, the lower end being formed with a curve as an extension of the central extent, and a handle of an enlarged diameter secured to the upper end of the wire.

2 Claims, 2 Drawing Sheets

HAND TOOLS FOR PULLING POSTS THROUGH COMPUTER PAPER PRINTOUTS

BACKGROUND OF THE INVENTION

1. Field of the Invention

The present invention relates to hand tools for pulling posts through computer paper printouts and more particularly pertains to pulling plastic posts through aligned holes of computer paper printouts.

2. Description of the Prior Art

The use of hand tools is known in the prior art. More specifically, hand tools heretofore devised and utilized for the purpose of pushing and pulling objects are known to consist basically of familiar, expected, and obvious structural configurations, notwithstanding the myriad of designs encompassed by the crowded prior art which has been developed for the fulfillment of countless objectives and requirements.

By way of example, the prior art discloses in U.S. Pat. No. 3,701,461 a hook for hand hooking rugs.

U.S. Pat. No. 4,281,445 discloses an apparatus and method for replacement of file folders having fasteners.

U.S. Pat. No. Des. 256,629 discloses the design of a crochet hook.

U.S. Pat. No. Des. 268,189 discloses the design of a pull ring for use with post binding mechanism.

In this respect, hand tools for pulling posts through computer paper printouts according to the present invention substantially departs from the conventional concepts and designs of the prior art, and in doing so provides an apparatus primarily developed for the purpose of pulling plastic posts through aligned holes of computer paper printouts.

Therefore, it can be appreciated that there exists a continuing need for new and improved hand tools for pulling posts through computer paper printouts. In this regard, the present invention substantially fulfills this need.

SUMMARY OF THE INVENTION

In view of the foregoing disadvantages inherent in the known types of hand tools now present in the prior art, the present invention provides an improved hand tool for pulling posts through computer paper printouts. As such, the general purpose of the present invention, which will be described subsequently in greater detail, is to pull posts through computer paper printouts which has all the advantages of the prior art and none of the disadvantages.

To attain this, the present invention essentially comprises a new and improved hand tool for pulling posts through computer paper printouts comprising, in combination, an essentially rigid wire with limited flexibility having an upper end and a lower end and an elongated linear central extent therebetween, the wire having a diameter of about 1/16 inch. The lower end is formed as an extension of the central extent with a 180 degree curve, the radius of curvature of the wire being about 1/16 inch, the linear extent being about $4\frac{1}{4}$ inches, and the wire also has a handle of an enlarged diameter secured to the upper end of the wire.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent of legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide new and improved hand tools for pulling posts through computer paper printouts which have all the advantages of the prior art hand tools and none of the disadvantages.

It is another object of the present invention to provide new and improved hand tools for pulling posts through computer paper printouts which may be easily and efficiently manufactured and marketed.

It is further object of the present invention to provide new and improved hand tools for pulling posts through computer paper printouts which are of durable and reliable constructions.

An even further object of the present invention is to provide new and improved hand tools for pulling posts through computer paper printouts which are susceptible of a low cost of manufacture with regard to both materials and labor, and which accordingly are then susceptible of low prices of sale to the consuming public, thereby making such hand tools for pulling posts through computer paper printouts economically available to the buying public.

Still yet another object of the present invention is to provide new and improved hand tools for pulling posts through computer paper printouts which provide in the apparatuses and methods of the prior art some of the advantages thereof, while simultaneously overcoming some of the disadvantages normally associated therewith.

Still another object of the present invention is to pull plastic posts through aligned holes of computer paper printouts.

Lastly, it is an object of the present invention to provide a new and improved hand tool for pulling posts through computer paper printouts comprising an essentially rigid wire with limited flexibility having an upper end and a lower end and an elongated linear central extent therebetween, the lower end being formed with a curve as an extension of the central extent, and a handle of an enlarged diameter secured to the upper end of the wire.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 4 is a front elevational view of the device of the prior Figure constructed in accordance with an alternate embodiment of the invention.

The same reference numerals refer to the same parts through the various Figures.

DESCRIPTION OF THE PREFERRED EMBODIMENT

Figures 1, 2:
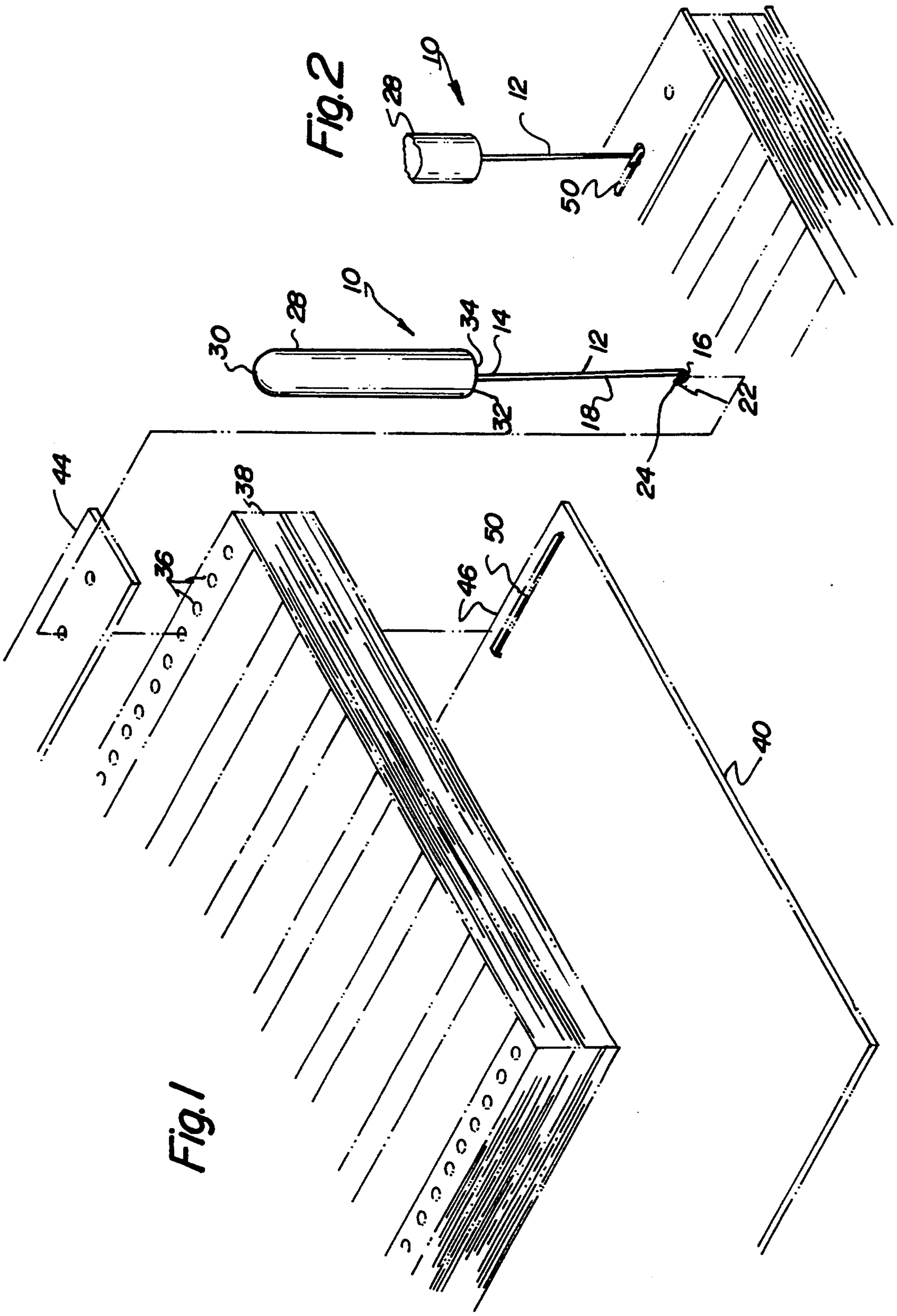
FIG. 1 is a perspective view of the preferred embodiment of the new and improved of the hand tool for pulling posts through computer paper printouts constructed in accordance with the principles of the present invention.
FIG. 2 shows the lower edge of the device of FIG. 1 pulling a post through the paper.

With reference now to the drawings, and in particular to FIG. 1 thereof, the preferred embodiment of the new and improved hand tool for pulling binders through computer paper printouts embodying the principles and concepts of the present invention and generally designated by the reference numeral 10 will be described.

The present invention, the new and improved hand tool for pulling binders through computer paper printouts, is comprised of a plurality of individual components. In their broadest context, the components include a wire and a handle. The upper end of the wire is coupled to the handle and the lower end of the wire is formed with a hook. The individual components are specifically configured and correlated with respect to each other to attain the desired objective.

More specifically, the wire 12 is formed of an essentially rigid material. It does, however, have limited flexibility. It is formed with an upper end 14 and a lower end 16. It also has an elongated central extent 18 between the upper end and lower end.

In the preferred embodiment, the wire has a diameter of about 1/16 of an inch. The lower end of the wire is formed as an extension of the central extent. The lower end includes a 180 degree curve 22. In this manner, the free end 24 at the lower end of the wire faces upwardly in the same direction as the upper end of the wire. The radius of curvature of the curve is about 1/16 of an inch. The linear extent is at least about $4\frac{1}{4}$ inches in length.

The tool is also provided with a handle 28. The handle is of any rigid material, preferably plastic. It has an enlarged diameter of about one inch. The handle has an upper end 30 and a lower end 32. The lower end of the handle is formed with an upwardly extending recess 34. The recess is about 1/16 inch in diameter centrally located therein. It is adapted to receive the upper end of the wire and be secured thereto as by a press fit and an adhesive. It is to be understood that other forms of coupling therebetween could readily be utilized. In this manner, the length of the wire is about 68 times greater than its diameter.

The width of the wire at the outside edge of the curve is about 3/16 of an inch.

The diameter of the wire is selected and the length of the wire is determined so as to allow the movement of the lower end of the wire with the curve to pass through any stack of apertures 36 of computer printout paper 38. Such apertures are normally about 3/16 of an inch with a height not recommended to exceed 6 inches. In this manner, a binder 40, which is normally $\frac{1}{8}$ inch in thickness and 8 inches in length, may readily be joined with the computer printout paper for coupling therebetween.

The binder normally includes a relatively rigid sheet of material 44 and 46 above and below. Posts 50 of semi-rigid material with a diameter of about $\frac{1}{8}$ inch are secured to an upper edge of the binder by conventional clasps above and below. The posts are pivoted perpendicular from the plane of the binder sheet and the apertures of the printout moved thereover. The free ends of the posts are then positioned through apertures in a supplemental binder strip positioned over the upper edge of the printout. Thereafter, the free end of the posts are moved through apertures in the supplemental binder and bent to thereby couple the lower and upper portions of the binder together through the posts thereof extending through the apertures of the computer printout paper.

Figure 3:
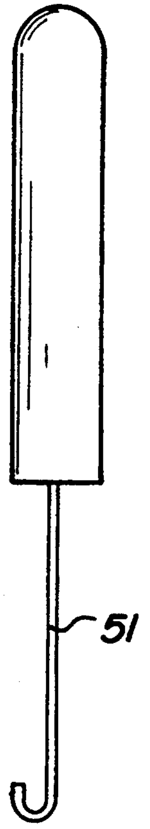
FIG. 3 is a front elevational view of the device of the prior Figure constructed in accordance with an alternate embodiment of the invention.
Figure 4:
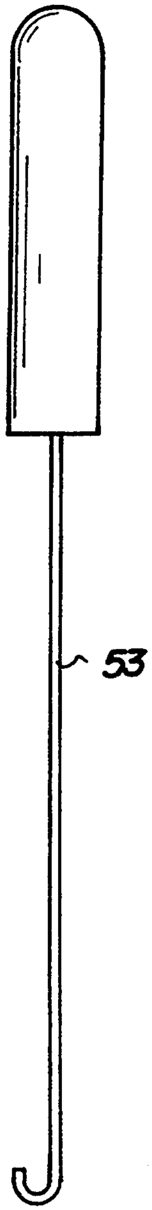
FIG. 4 is a fron2 shows the lower edge of the device of FIG. 1 pulling a post through the paper.

An alternate embodiment of the invention is shown in FIG. 3. The diameter of the wire is maintained substantially the same. The 180 degree curve at the end of the wire is substantially the same. This is necessary to allow passage of the free end of the wire and its curve to pass through the aperture of the computer printout. In order to accommodate posts of different lengths for different thicknesses of computer printouts, the length of the central extent 51 of the wire is as small as $3\frac{1}{4}$ inches for small stacks of paper, note FIG. 3, and the central extent 53 is as large as $5\frac{1}{4}$ inches for larger stacks of paper, note FIG. 4. This renders the length of the wire about 52 to 84 times the diameter of the wire. Greater or lesser dimensions of plus or minus 10 percent are acceptable.

Figure 5:
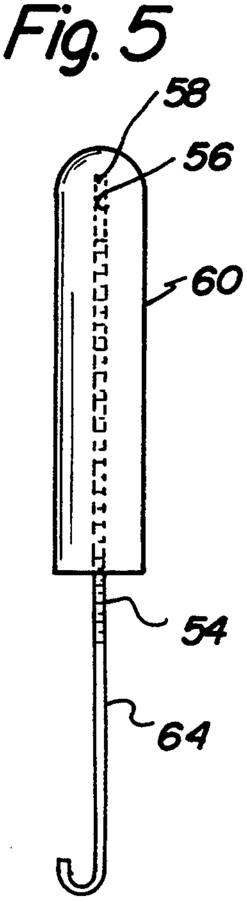
FIG. 5 is a front elevational view of the device of the prior Figure constructed in accordance with an alternate embodiment of the invention.

An alternate embodiment is shown in FIG. 5. In such embodiment there is included screw threads 54 on the upper exterior periphery of the central extent 64 and internal screw threads 56 formed in a bore 56 extending upwardly from the lower end of the handle 60 in cooperative relationship with the threads of the central extent. In this manner, rotation of the central extent with respect to the handle will cause the central extent to expand and contract in length when measured from the handle.

As used herein, the length of the central extent of the wire is extended to refer to the length of the wire from the area adjacent to the handle to the farthestmost point of the curve. This is the extent that is necessary for passage through the apertures of a stack of computer printout paper to allow hooking the posts and pulling it through the apertures.

The present invention comprises a hand tool which is used on binders and is used to hold computer paper printouts. Binders offer the most convenient way to file and store the printouts because they can hold a large number of sheets together, while making it very easy to find and read any one of them.

To mount sheets, the posts are started through, then the present invention is used to pull them through. As with any somewhat flexible pieces, if the posts are loaded in compression, they tend to bend. On the other hand, a tensile force keeps them straight. This attribute makes it very easy to pull posts through, rather than attempting to push the paper over them. A common everyday task then becomes a simple effort.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A hand tool for pulling posts through computer paper printouts comprising, in combination:

an essentially rigid wire of a constant diameter with limited flexibility having an upper end and a lower end and an elongated linear central extent therebetween, the wire having a diameter of about 1/16 inch, the lower end being formed as an extension of the central extent with a 180 degree curve forming a radius of curvature, the radius of curvature of the wire being about 1/16 inch, the linear extent being about $4\frac{1}{4}$ inches, the wire also having a one-piece handle of an enlarged diameter secured to the upper end of the wire; and screw threads on the upper exterior periphery of the central extent and internal screw threads formed in an axial bore extending upwardly from the lower end of the handle in cooperative relationship with the threads of the central extent whereby rotation of the central extent with respect to the handle will cause the central extent to expand and contract in length when measured from the handle to thereby vary the distance of the curve from the handle.

2. The tool as set forth in claim 1 wherein the central extent of the wire has a length of about 64 times its diameter plus or minus 20 percent.

* * * * *